United States Patent
Wu et al.

[11] Patent Number: 6,109,710
[45] Date of Patent: Aug. 29, 2000

[54] SIDE DOOR FOR COMPUTER CHASSIS

[75] Inventors: Thomas Gordon Wu, Monterey Park; Gary Phillip Elsasser, Mission Viejo; Robert Dennis Brunner, Los Gatos, all of Calif.

[73] Assignee: Toshiba America Information Systems, Inc., Irvine, Calif.

[21] Appl. No.: 09/031,403

[22] Filed: Feb. 26, 1998

[51] Int. Cl.⁷ ..................................................... H05K 7/18
[52] U.S. Cl. ...................... 312/223.2; 312/311; 312/328
[58] Field of Search .............................. 312/223.2, 223.1, 312/327, 328, 311, 310; 361/724, 725, 727

[56] References Cited

U.S. PATENT DOCUMENTS

| | | |
|---|---|---|
| 4,084,250 | 4/1978 | Albertine et al. . |
| 4,717,216 | 1/1988 | Hornak ................................. 312/257.1 |
| 4,758,712 | 7/1988 | Matone, Jr. et al. ............. 312/223.2 X |
| 4,850,657 | 7/1989 | Placke et al. ........................ 312/263 X |
| 4,909,579 | 3/1990 | Liu . |
| 5,032,951 | 7/1991 | Schropp et al. . |
| 5,269,598 | 12/1993 | Liu . |
| 5,301,346 | 4/1994 | Notarianni et al. .................. 361/727 X |
| 5,398,161 | 3/1995 | Roy ......................................... 361/727 |
| 5,423,605 | 6/1995 | Liu . |
| 5,519,572 | 5/1996 | Luo . |
| 5,572,402 | 11/1996 | Jeong .................................. 361/727 X |
| 5,593,220 | 1/1997 | Seid et al. . |
| 5,598,318 | 1/1997 | Dewitt et al. . |
| 5,661,631 | 8/1997 | Crane, Jr. . |
| 5,680,579 | 10/1997 | Young et al. . |
| 5,683,156 | 11/1997 | Chen et al. . |
| 5,684,671 | 11/1997 | Hobbs et al. . |
| 5,738,424 | 4/1998 | Katz et al. ........................ 312/223.1 X |
| 5,774,331 | 6/1998 | Sach ................................... 361/725 X |
| 5,801,921 | 9/1998 | Miller ................................. 361/727 X |
| 5,825,626 | 10/1998 | Hulick et al. .................... 312/223.2 X |
| 5,859,767 | 1/1999 | Fontana ............................... 361/683 X |

*Primary Examiner*—Janet M. Wilkens
*Attorney, Agent, or Firm*—Pillsbury Madison & Sutro, LLP

[57] ABSTRACT

A chassis cover for a host unit of a computer system is disclosed. The chassis cover is preferably capable of covering a chassis which includes mountings for components which are movable in a direction. The chassis cover includes a first surface, and a movable side door having a closed position and an open position. The side door provides an opening in the chassis cover when in the open position to permit the mountings to be extended toward the opening when the side door is in the open position. By permitting the mountings to be extended toward an opening provided by the side door, the components within the host unit may be accessed and serviced without removing a heavy display monitor.

11 Claims, 11 Drawing Sheets

SIDE DOOR FOR COMPUTER CHASSIS

BACKGROUND

1. Field of Invention

Features of a personal computer system housing are disclosed. In particular, features of a chassis cover for a computer host unit are disclosed.

2. Related Art

Personal computer systems generally include at least a display portion, a keyboard and a host portion. The host portion of a personal computer typically includes several chip sets or modular boards, media drives (e.g., hard disk drive, floppy disk drive and CD ROM drive) and the like which are secured to a chassis with appropriate mountings. The modular boards and chip sets may comprise expansion cards to support communication with peripheral devices, RAM, or a motherboard which includes a central processor unit, timing circuitry, and a circuitry for basic input/output system (BIOS). Personal computer systems may be of a portable variety or desktop variety.

Desktop personal computers typically include a host unit, a detachable display terminal including a cathode ray tube (CRT), a detachable keyboard, and a detachable pointing device such as a mouse. The host unit typically includes ports for receiving cables to connect the keyboard, pointing device, or other external devices. The host unit also typically includes mechanisms for externally receiving media (e.g., floppy disks, and CD ROMs). The host unit includes a chassis for mounting the boards, drives, and a chassis fan which is mounted at the rear of the chassis. The host unit typically includes a chassis cover. The chassis cover typically includes a front bezel which allows a user to externally insert media into the drives.

Desktop personal computers in an office environment are typically configured in a tower configuration or in a horizontal configuration. In the tower configuration, the host unit is configured vertically so that it rests beneath a desk or to the side of the desk and the display monitor is secured or placed on top of the desk. In the horizontal configuration, the host unit is laid horizontally on top of the desk, for example, while the display monitor rests on top of the host unit. Servicing or modifying media drives modular service boards within the host unit typically requires removing the entire chassis cover from the chassis to allow service personnel access to the modular boards. Thus, when the desktop personal computer is horizontally configured with a display monitor resting on top, the service personnel must remove the heavy CRT display terminal from the top of the host unit so that the chassis cover may be removed.

Unfortunately, particularly in small offices or in a cubical environment, cramped spaces makes it difficult for servicemen to remove a heavy display terminal from the top of the host unit to then permit removal of the chassis cover. Additionally, lifting and movement of the display monitor may result in damage to the display monitor or cause lifting injuries to the various personnel who must move the display monitor to remove the chassis cover. Accordingly, there is a need for more convenient access to the components mounted to the chassis of a host unit.

SUMMARY

An object of an embodiment of the present invention is to provide a computer system which includes a host unit permitting easy access to components housed therein.

Another object of an embodiment of the present invention is to provide a chassis cover for a chassis of the host unit of a computer system.

Another object of an embodiment of the present invention is to provide a host of computer system which reduces the risk of lifting injuries to service personnel and damage to a display monitor as a consequence of servicing components within the host.

Another object of an embodiment of the present invention is to provide a desktop personal computer system which permits convenient access to the motherboard while a heavy display monitor rests on the host unit which houses the motherboard.

Briefly, an embodiment of the present invention is directed to a chassis cover for a host unit of a computer system. The chassis cover is preferably capable of covering a chassis which includes mountings for components which are movable in a direction. The chassis cover includes a first surface, and a movable side door having a closed position and an open position. The side door provides an opening in the chassis cover when in the open position to permit the mountings to be extended toward the opening when the side door is in the open position.

By permitting the mountings to be extended toward an opening provided by the side door, the components within the host unit may be accessed and serviced without removing a heavy display monitor. This is advantageous when servicing or modifying computer systems in small offices or in office cubicles providing little space for service personnel to service desktop computers.

DETAILED DESCRIPTION

An embodiment of the present invention is directed to a chassis cover for a host unit of a personal computer which includes a side door. The side door allows service personnel to have access the motherboard, or other components mounted to the host chassis, without removing a heavy display monitor which may rest on top of the host unit in a horizontal orientation. This permits more convenient access to the components of the chassis in cramped spaces such as small offices or cubicle. Additionally, by eliminating the need to move a heavy display monitor which may rest on top of the host unit, the risk of damage to the display monitor and injury to service personnel from lifting heavy display monitors is reduced.

Figure 1:
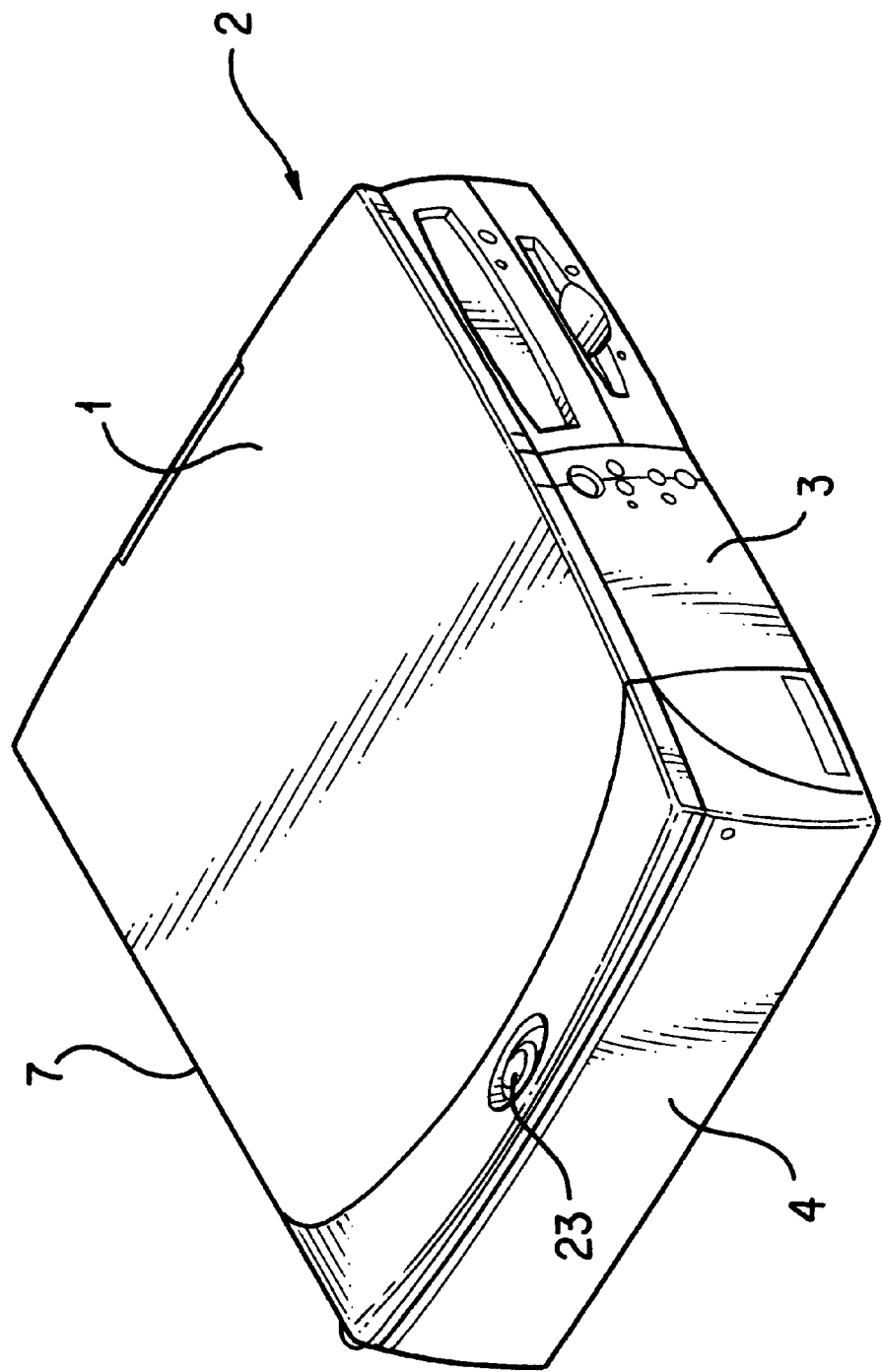
FIG. 1 shows a host unit of a desktop personal computer according to an embodiment.

FIG. 1 shows a host unit 2 according to an embodiment of the present invention. The host unit 2 includes a chassis to which internal components may be mounted (not shown). The chassis is covered by a chassis cover 1. The host unit 2 includes a chassis assembly 6 and a side door 4. The plastic parts of the chassis assembly 6 and the side door 4 are preferably separately formed from an injection molding process known to those of ordinary skill in the art for forming chassis covers for personal computer hosts. The chassis assembly 6 includes a chassis cover 1 and a side cover opposite the side door 4. The chassis assembly 6 further includes a front bezel 3 and a rear surface 7. According to an embodiment, the host unit 2 may be configured horizontally on a desktop with a display monitor (not shown) resting on the top surface 1. As illustrated in FIG. 1, the host unit 2 is in a horizontal orientation with width, length and height dimensions. The embodiment of FIG. 1 shows that the length and the width dimensions are at least twice the height dimensions.

Figure 2:
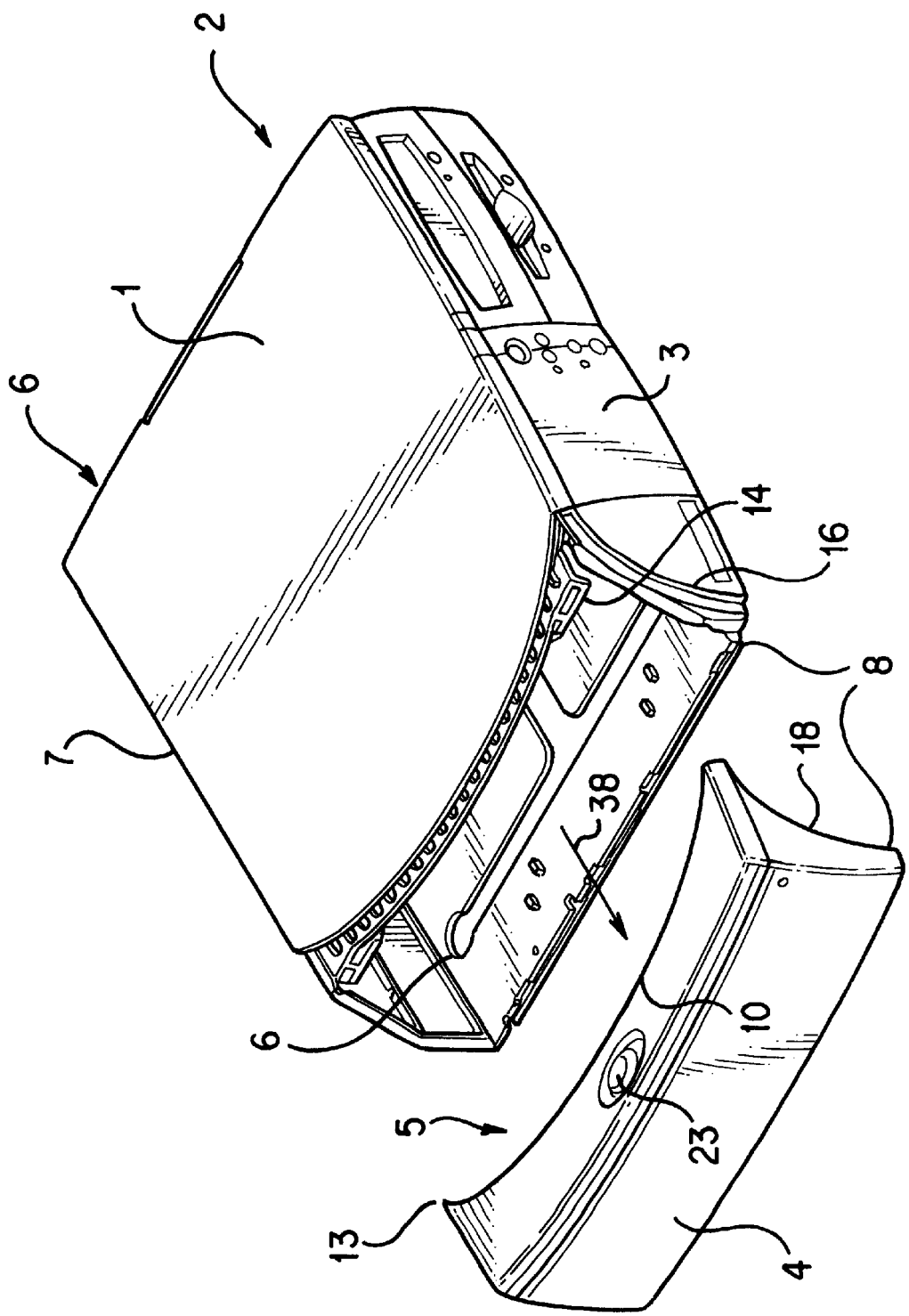
FIG. 2 shows an embodiment of the host unit shown in FIG. 1 in which a side door of a chassis cover is in an open position.

FIG. 2 shows the host unit 2 of FIG. 1 in which the side door 4 is in an open position. The side door 4 includes a top edge 10 and the chassis cover 1 includes a top edge 14 which meets the top edge 10 of the side door 4 when the side door is in the closed position as shown in FIG. 1. The side door 4 is preferably coupled to a base portion of the chassis (not shown) of the host unit 2 at a hinge 8. Thus, the top edge 10 of the side door 4 pivots about the hinge 8 in a direction 5 when the side door 4 swings open. According to an embodiment, when the side door 4 pivots in the direction 5 by about forty five degrees from the closed position, the side door 4 detaches from the chassis assembly. A motherboard 12 is mounted to motherboard assembly 22. According to an embodiment shown in FIG. 3, the motherboard 12 and motherboard assembly 22 as an assembly slide out in a direction 38 on rails (not shown) which are attached to the motherboard. Thus, when the side door 4 is in the open and removed position as shown in FIG. 2, service personnel may slide the motherboard assembly toward of the opening provided by the side door 4 to have access to the motherboard assembly. This can all be performed while a heavy display monitor (not shown) is positioned on top of the chassis cover of the host unit 2.

In an alternative configuration, the side door 4 may be hinged at the top edge 10 so that the side access door 4 opens and closes upward as opposed to downward as shown at direction 5. Also, the side door 4 may be hinged to the front bezel 3 at a side edge 18 or hinged to the rear portion 7 at a side edge 13. In this manner, the side access door 4 may open and close along a horizontal plane.

Figure 3:
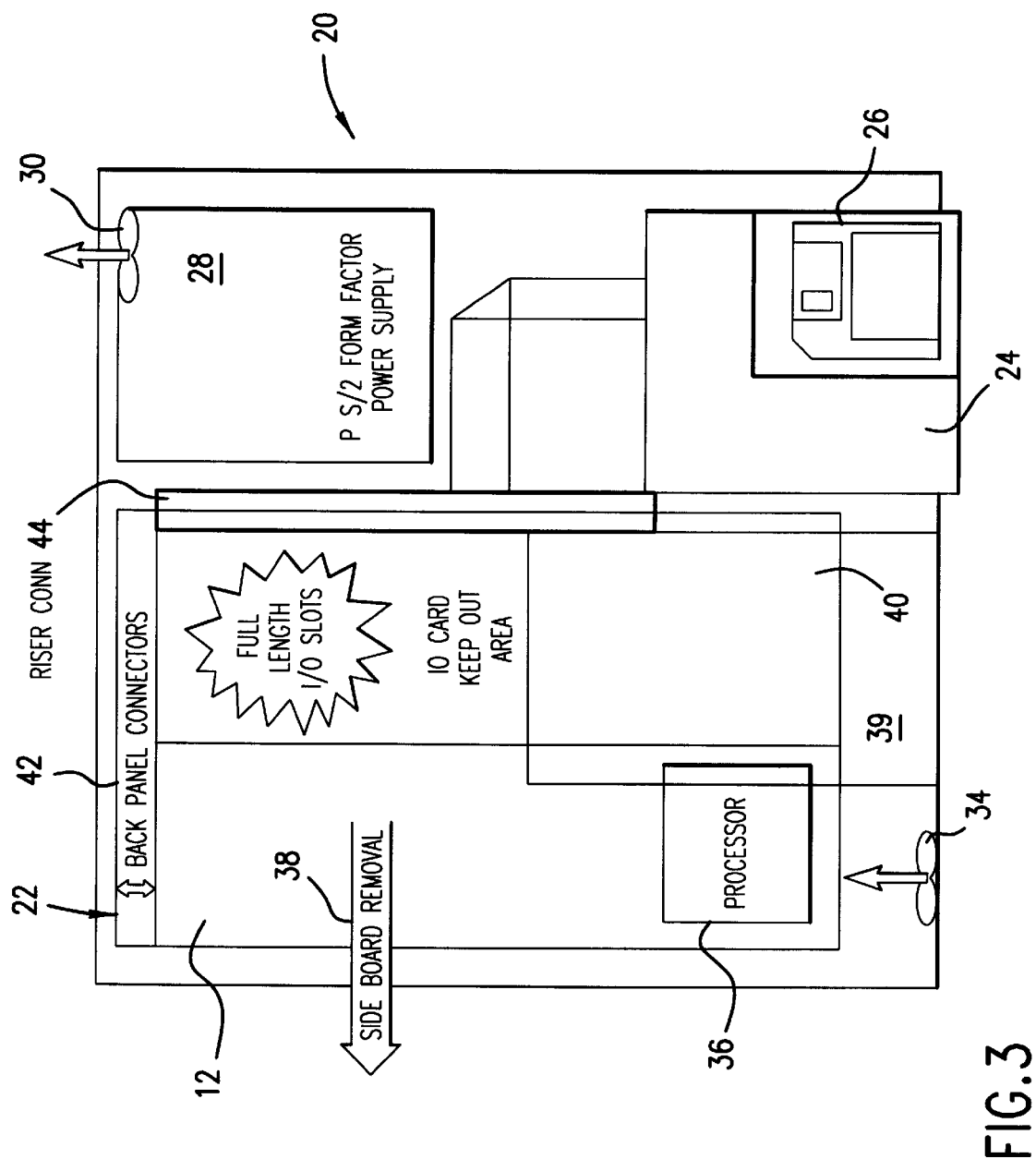
FIG. 3 shows an embodiment of a chassis disposed within a chassis cover as shown in FIGS. 1 and 2.

FIG. 3 shows the configuration of an embodiment of a chassis assembly 20 disposed within the host unit 2 of FIGS. 1 and 2. Several components are mounted to the chassis 20 including a power supply 28 (which includes a fan 30), a hard disk drive 39, a 5.25 inch bay drive 24, a 3.5 inch bay drive 26, a chassis fan compartment 34, and a motherboard shield 22 to which the motherboard 12 is mounted. Also attached to the motherboard shield 22 are back panel connectors 42. The components mounted to the riser card 40 are coupled to the power supply 28 and the bay drives 24 and 26, and hard disk drive 39 through cables coupled to the riser connection 44. According to an embodiment, the configuration of chassis 20 is compliant with the NLX Motherboard Specification, Release 1.2, published by Intel Corporation, March 1997.

Figure 13:
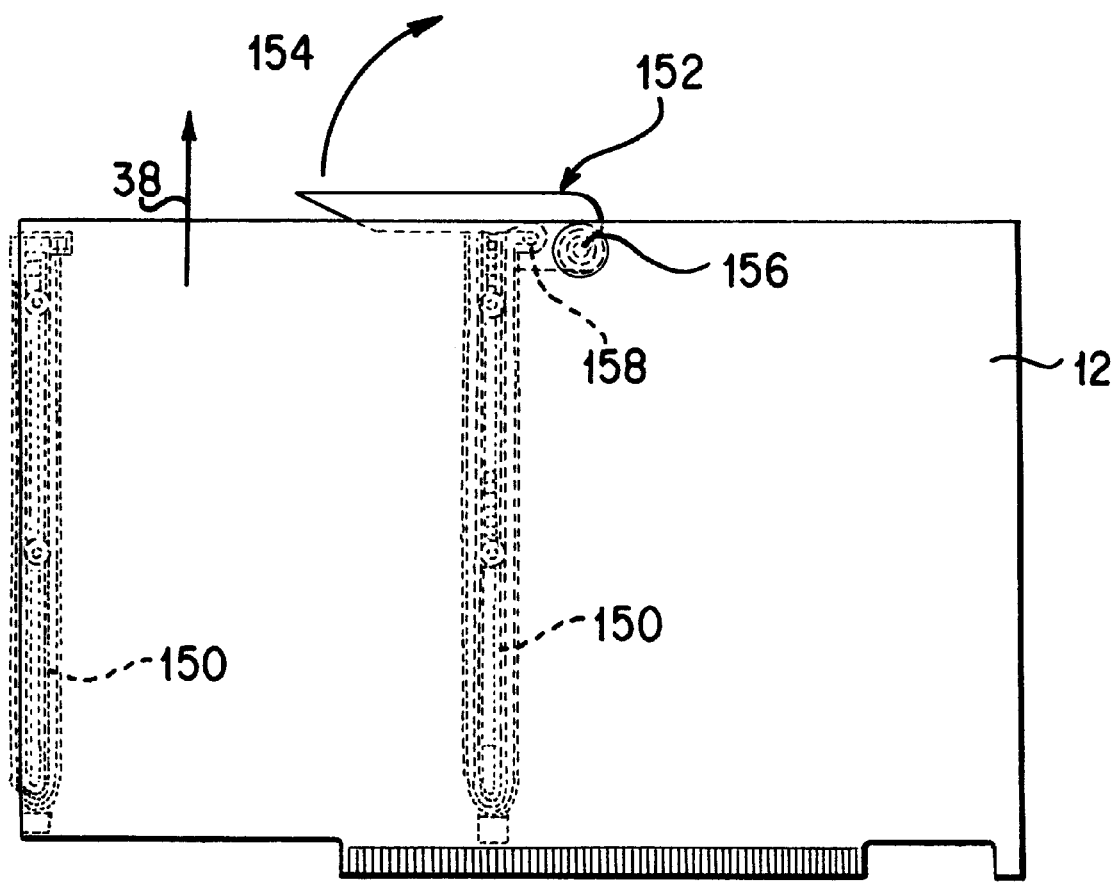
FIG. 13 shows slidable rails which are mounted to a motherboard according to the embodiment shown in FIG. 3.

The motherboard assembly 22 preferably includes slidable rails (not shown). This is described in detail in the NLX Chassis Design Suggestions, Version 1.0, Section 3.1, published by Intel Corporation, May 1997, and the NLX Rail Design Suggestions, Version 1.0, published by Intel Corporation, May 1997. This allows easy access to the processor 36 or other components mounted to the motherboard 12 when the motherboard 12 is slid out in the direction 38. FIG .13 shows an embodiment of the motherboard 12 shown in FIG. 3 which is coupled to slidable mounting rails 150. The broken lines in FIG. 13 indicate that the rails 150 are on the opposite side of the motherboard 12. Rail guides (not shown) are mounted to a base of the chassis (not shown) which engage the sliding rails 150 which are mounted to the motherboard 12. The motherboard 12 slides with the mounted rails 150 in the direction 38 as the rails 150 translate in the direction 38 within the rail guides which are mounted to the base of the chassis. A lever 152 is mounted to the base of the chassis at a pivot point 156. A tooth 158 formed on the lever 152 engages a projection of a rail 150 such that when the lever 152 is rotated in a direction 154 about the pivot point 156, the rails 150 slide in the direction 38 along with the motherboard 12.

Figure 4:
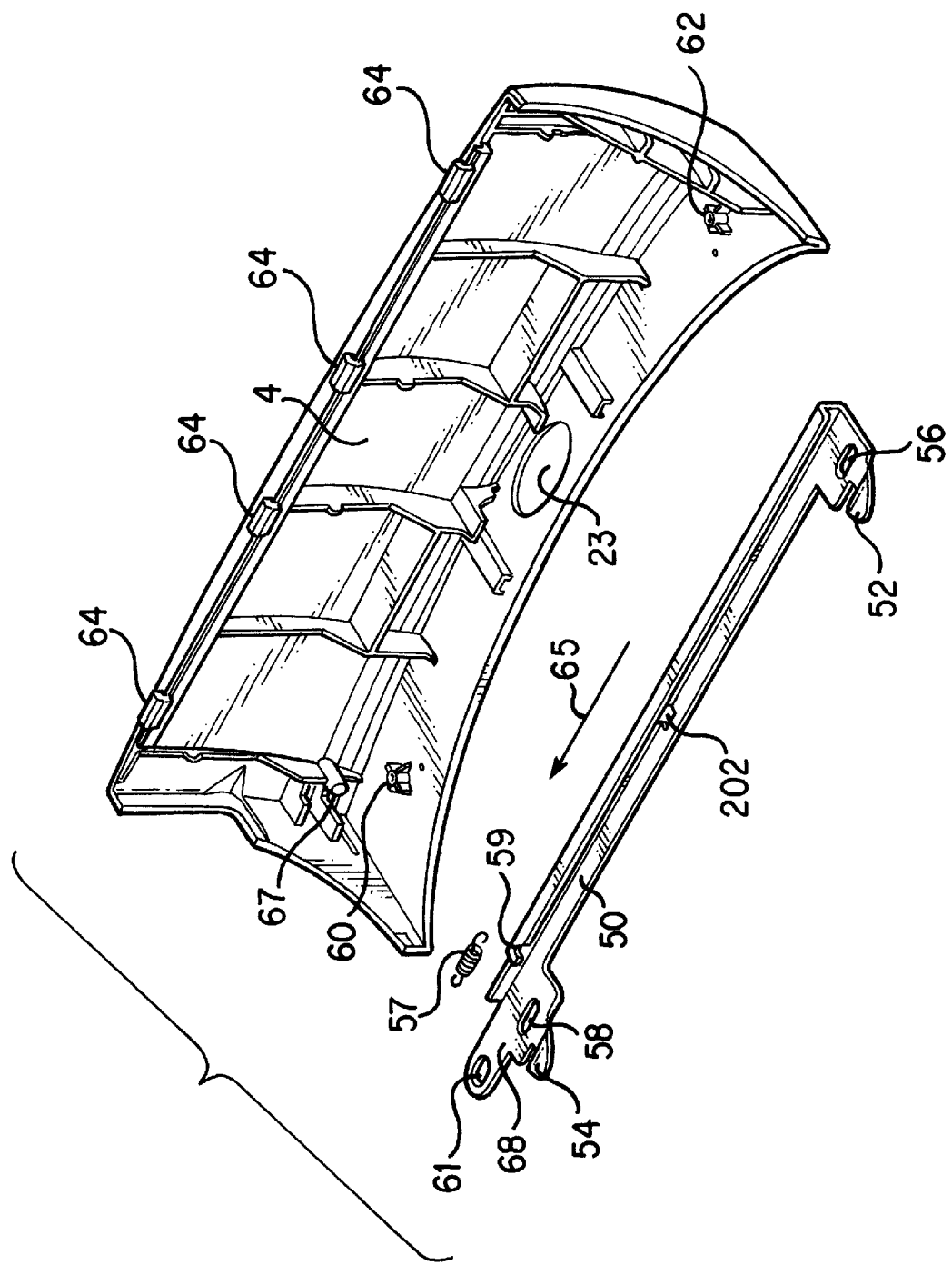
FIG. 4 shows an embodiment of the side door shown in FIG. 2.

FIG. 4 shows an interior view of the side door 4 shown in FIGS. 1 and 2. Four hooks 64 extend longitudinally across the side door 4 and form a hinge with four rectangular holes 72 formed in the base of the chassis (not shown) as discussed in greater detail below. This allows the side door 4 to rotate about the four hooks 64 while engaged to the four rectangular holes 72 to align the side door 4 with the chassis assembly 6 and prevent lateral movement. The hooks 64 are preferably formed from the single injection molding process for manufacturing the side door 4.

A lock bar 50 is preferably attached to the side access door 4 to enable the top edge 10 of the side access door 4 to secure to the chassis assembly 6 when in the closed position. The lock bar 50 may be secured to the side access door 4 by screws or rivets through elongated holes 56 and 58 of the lock bar 50 to holes 60 and 62 of the side door 4. The lock bar 50 preferably includes two notched flanges 52 and 54. Additionally, the lock bar 50 is preferably formed from sheet metal.

Figure 5:
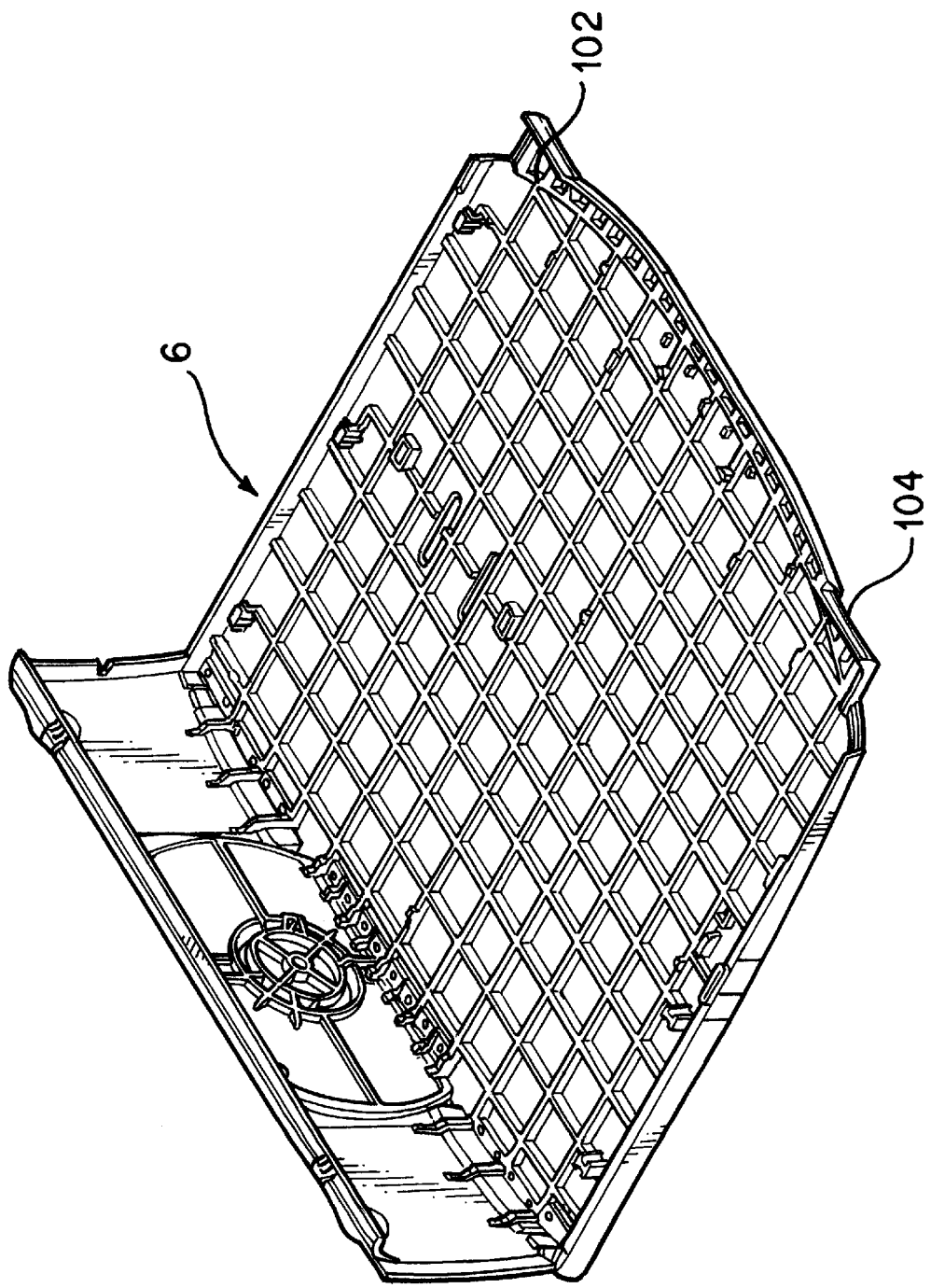
FIG. 5 shows an embodiment of the main part of the chassis cover shown in FIGS. 1 and 2.

FIG. 5 shows an interior view of the chassis assembly 6 shown in FIGS. 1 and 2 which includes locking holes 102 and 104. Locking holes 102 and 104 are formed to engage the flanges 52 and 54 when the side door 4 is in a closed position. The locking holes 102 and 104 include a protrusion (not shown) to engage the notches in the flanges 52 and 54 to secure the side door 4. Locking holes 102 and 104 are preferably formed during the injection molding process for forming the chassis cover 1.

The holes 56 and 58 are preferably elongated to allow the lock bar 50 to slide back and forth in the lengthwise direction when mounted to holes 60 and 61. A spring 57 is preferably attached at one end to the lock bar 50 at notch 59 and attached at another end to the side door 4 at a screw (not shown) mounted in a boss 67. The spring 57 thus provides a force against the lock bar 50 in a direction 65. The lock bar 50 preferably includes a protrusion 68 having a padlock hole 61.

When the side access door 4 is rotated about the hooks 64 to the closed position, the flanges 52 and 54 slide over the protrusions in the locking holes 102 and 104 of the chassis cover 1 until the notch portions of the flanges 52 and 54 slide over the protrusions. The force of the spring 57 in the direction 65 secures the notches of the flanges 52 and 54 against the protrusions in the locking holes 102 and 104 to close the lock bar 50, and thus the attached side access door 4, into the closed position against the chassis cover 1.

As shown in FIGS. 1 and 2, the side door 4 preferably includes a button 23 which is slidable in a channel (not shown) in a lengthwise direction. The button 23 includes a boss (not shown) which engages the lock bar 50 at a hole 202. Thus, to release the side door 4, service personnel need only move the button 23 in a direction opposite the direction 65 against the force of the spring 57 until the notches of the flanges 52 and 54 clear the protrusions of the holes 102 and 104 of the chassis cover 1. The protrusion 68 of the lock bar 50 preferably extends beyond the door when the side door 4 is in the closed position. A padlock may be inserted through the padlock hole 61 to lock the side access door 4 in the closed position.

Figure 6:
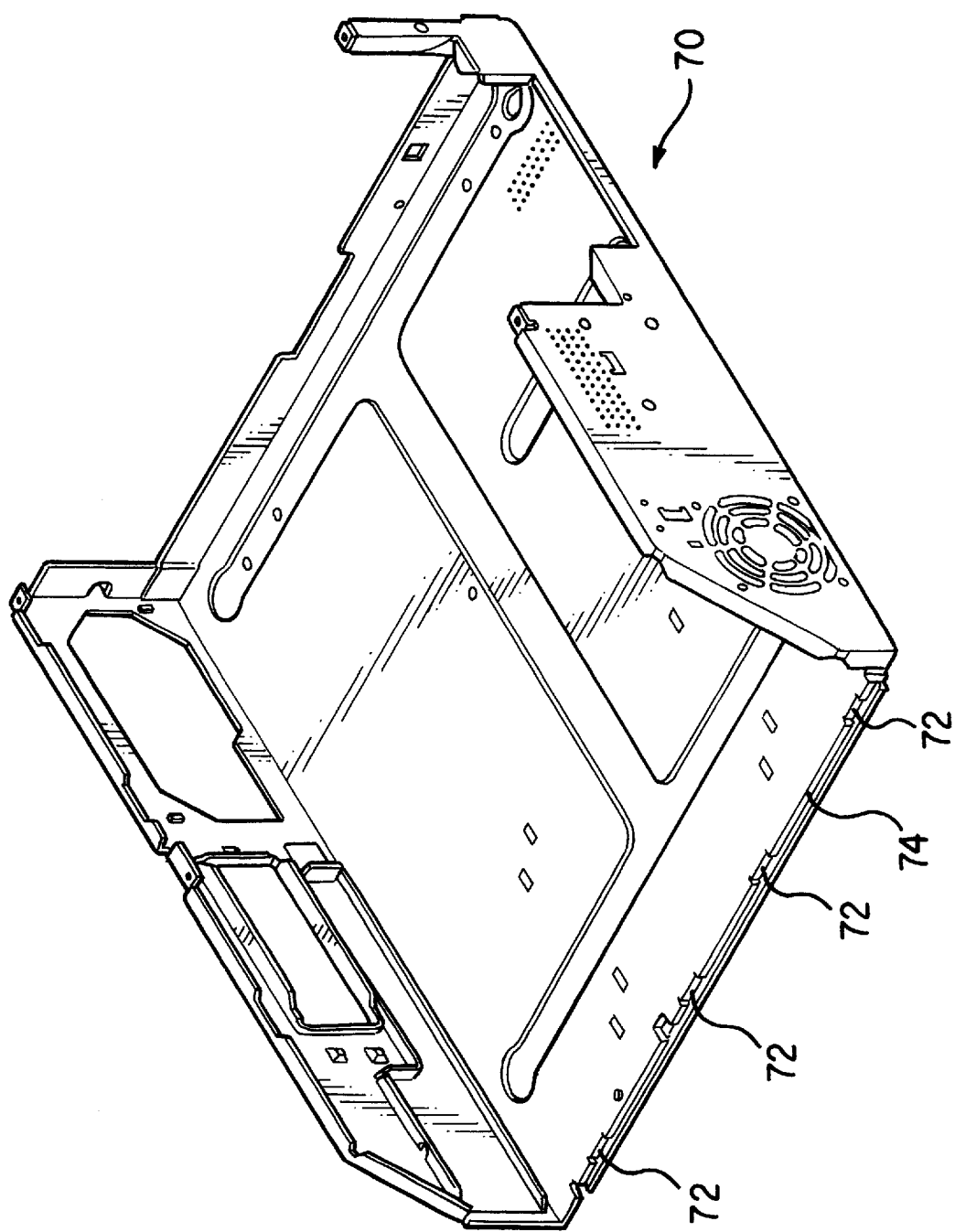
FIG. 6 shows an embodiment of a chassis base of the host unit shown in FIGS. 1 and 2.
Figure 7:
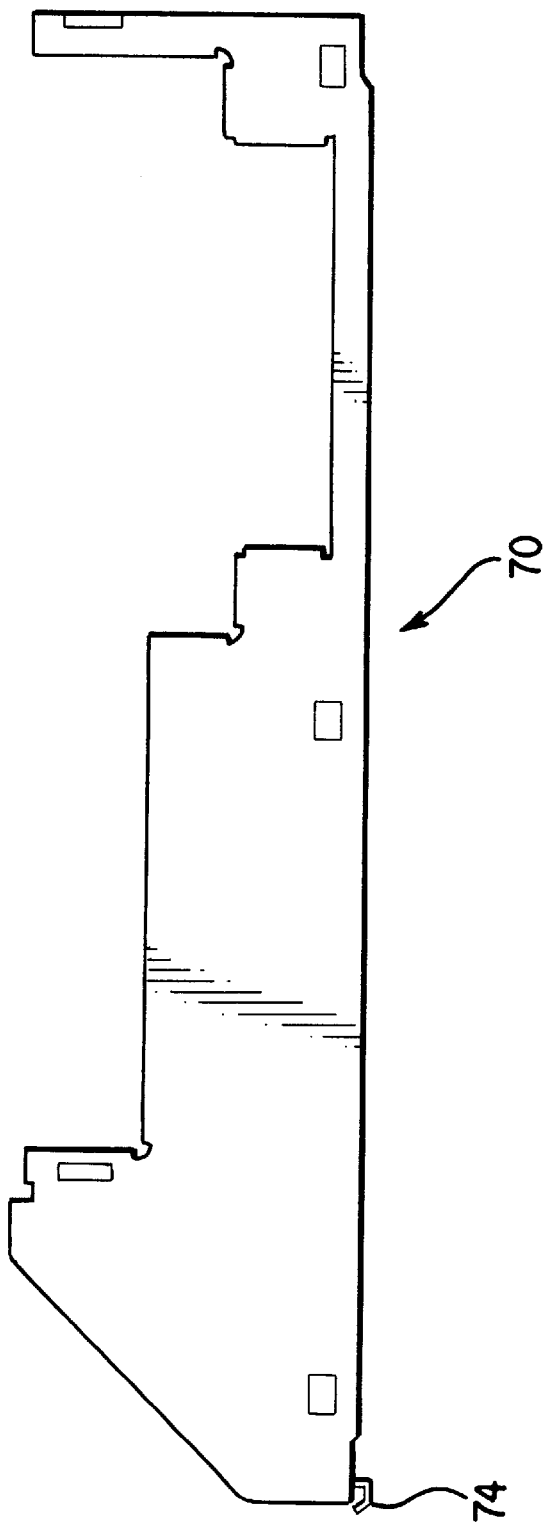
FIGS. 7 and 8 show cross-sectional views of the chassis base shown in FIG. 6.
Figure 8:
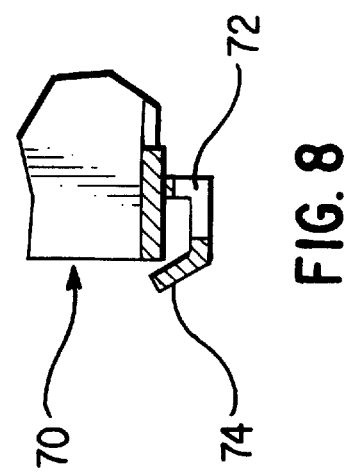

FIG. 6 shows an embodiment of a base 70 of the chassis assembly 20 shown in FIG. 3 which is housed within the host unit 2 shown in FIGS. 1 and 2. The base 70 includes a channel portion 74 with rectangular holes 72 evenly spaced in the channel portion 74. As discussed above with reference to FIG. 4, the hooks 64 of the side door 4 fit into the holes 72 of the base 70. This forms the hinge 8 (FIG. 2) about which the side door 4 pivots from the open and closed positions. FIG. 7 shows a cross sectional view of the base 70 with the channel 74 through one of the holes 72. FIG. 8 shows an enlargement of the cross sectional view of the channel 74 of the base 70 shown in FIG. 7.

Figure 9:
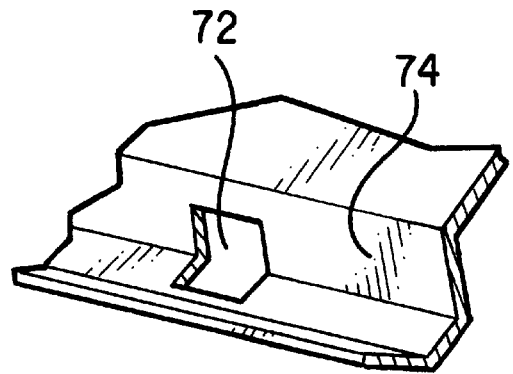
FIG. 9 shows an enlarged view of a rectangular hole formed in the channel portion of the chassis base.
Figure 10:
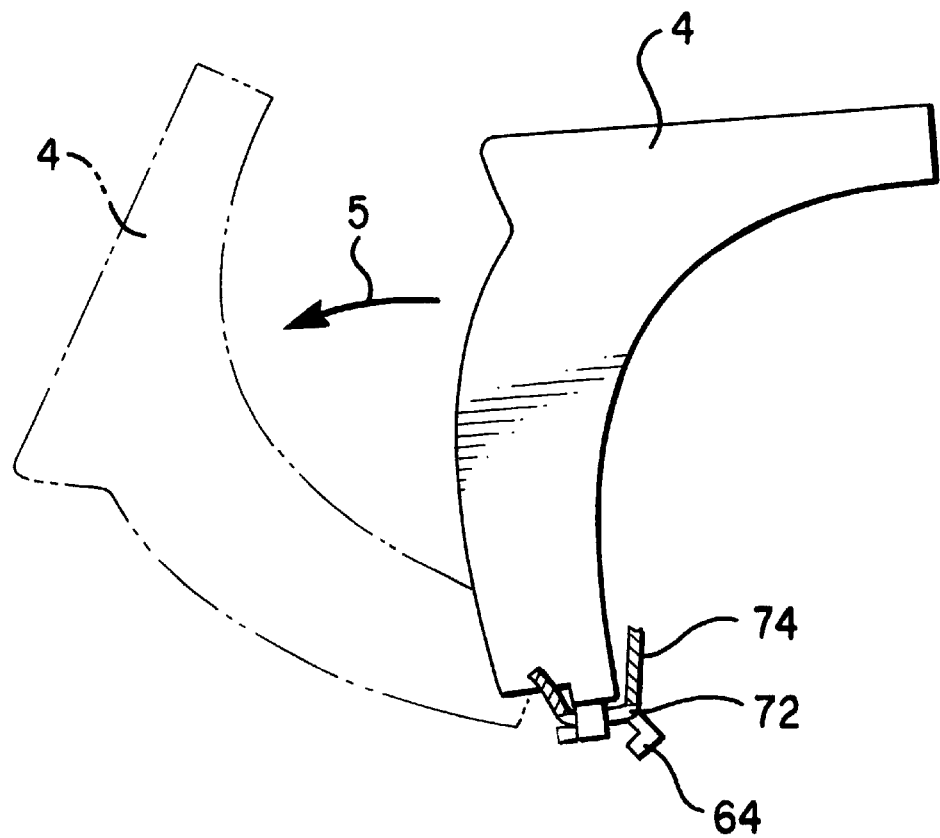
FIG. 10 shows an enlarged view of the hinge formed by the side door and the chassis base.

FIG. 9 shows an enlargement of a different view of the channel 74 of the chassis base which shows the placement of the rectangular holes 72 for receiving the hooks 64 of the side door 4 to form a hinge. FIG. 10 shows the side door 4 moved from the closed position to the open position in the direction 5 by rotating about the hinge formed by the rectangular holes 72 and the hooks 64. As shown in FIG. 10, the side door 4 detaches from the chassis base when rotated by about forty five degrees from the closed position.

Figure 11:
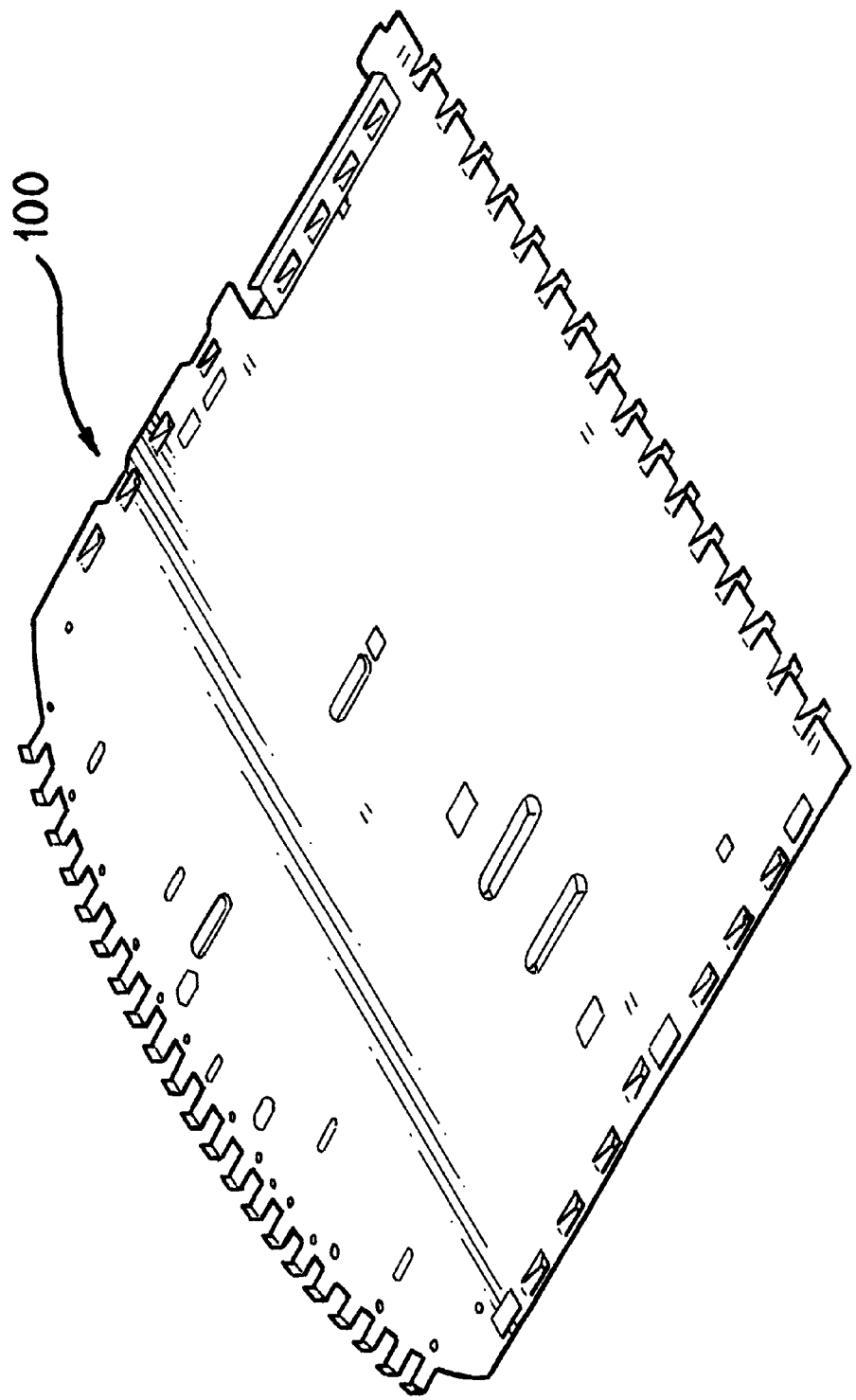
FIG. 11 shows a shielding member attachable to the main part shown in FIG. 5.

According to an embodiment of the host unit 2 shown in FIGS. 1 and 2, metal shielding reduces electromagnetic interference (EMI). FIG. 11 shows a shielding plate 100 which is attached to the main part 6 shown in FIGS. 1, 2 and 5.

The underside of the chassis cover 1 shown in FIG. 5 includes heat stakes (not shown) which protrude from the surface of the underside. The heat stakes are preferably formed during the injection molding process for forming the chassis cover 1. In a well known process, the heat stakes are inserted through small holes in the shielding 100 and then heated until soft. Pressure is then applied to the softened heat stakes until they flatten to form a mushroom shaped end over the hole. When the heat stakes cool, the shielding 100 is secured in place.

Figure 12:
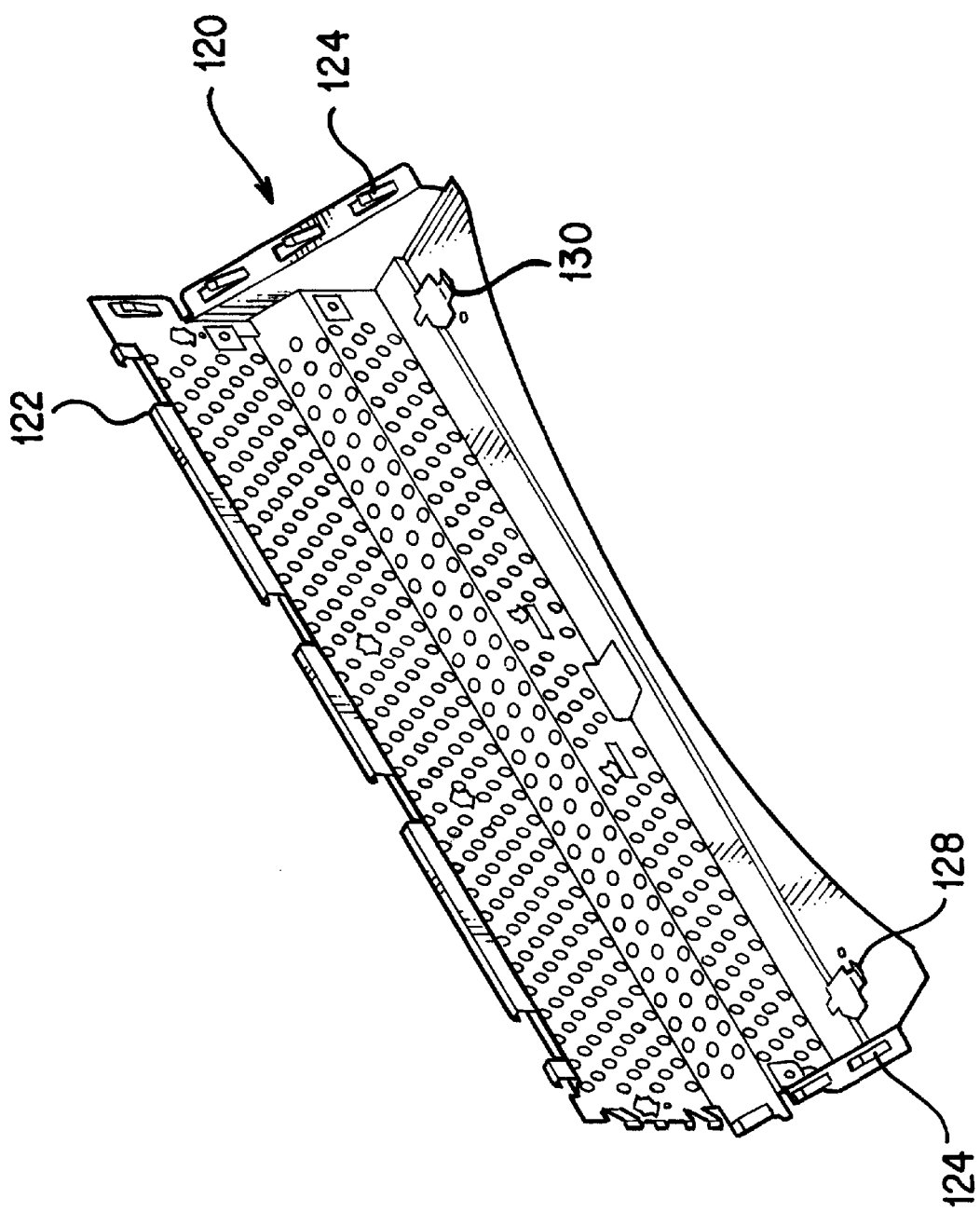
FIG. 12 shows a shielding member attachable to the side door shown in FIG. 4.

Similarly, shielding 120 shown in FIG. 12 attaches to the underside of the side door 4. The shielding 120 also includes a channel 122 for receiving the hooks 64. The shielding 120 preferably snaps on to the underside of the side access door 4 prior to attaching the lock bar 50 (FIG. 4). Alternatively, the shielding 120 may be attached to the side door 4 using a heat stake process as described above in connection with the attachment of the shielding 100. The shielding 120 preferably includes holes 128 and 130 to allow the insertion of screws into the holes 60 and 62 (FIG. 4) to secure the lock bar 50.

Regarding shielding for other surfaces of the host unit 2, the chassis base 70 (FIG. 6) provides shielding for a bottom side, the front side, the rear side and a right side. Thus, the shielding 100 and 120 need only shield the top side and a left side (i.e., the side including the side door 4) of the host unit 2.

As discussed above, the host unit 2 includes chassis cover having a separate side door 4 separately formed from a chassis assembly. The side door 4 enables service personnel to access the motherboard without having to remove a heavy display monitor resting on top of the host unit 2. Thus, service personnel may easily repair or modify the components in the host unit 2 in cramped spaces, while reducing the risk of lifting related injuries to the service personnel and damage to the display monitor from moving the display monitor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a computer system including a display monitor and a host unit, the host unit including a chassis and a chassis cover, the host unit having a horizontal orientation with width, length and height dimensions, the width and length dimensions being at least twice the height dimension, the chassis including a base with mountings for a motherboard which are movable in a direction, the host unit including:
   an exterior top surface; and
   a movable side door having a closed position and an open position, the side door having a first edge common with the exterior top surface when the side door is in the closed position, the side door providing an opening in the host unit when in the open position,
   wherein the mountings are extendable toward the opening when the side door is in the open position and
   wherein the base includes a rear exterior surface and the side door includes a second edge and the chassis cover includes a front bezel, wherein the second edge is attached at a hinge and the first edge is attached to the exterior top surface when the side door is in the closed position, and wherein the unhinged first edge detaches when the side door is in the open position.

2. The computer system of claim 1, wherein the side door is capable of opening to provide access to components mounted to the chassis while the display monitor rests on the exterior top surface.

3. The computer system of claim 1, wherein the display monitor includes a cathode ray tube.

4. The computer system of claim 1, wherein the chassis cover is formed in part from injection molded plastic such that the side door is formed separately from the exterior top surface.

5. The computer system of claim 1, wherein the second edge couples to the base to form a hinge.

6. A host unit of a computer system including a chassis and a chassis cover, the chassis cover including:
   an exterior top surface when the chassis cover is in a horizontal orientation; and
   a movable side door having a closed position and an open position, the side door having a first edge common with the exterior top surface, the side door providing an opening in the cover when in the open position which permits access to an interior of the chassis cover when the side door is in the open position, wherein when the chassis cover is in the horizontal orientation the chassis cover has width, length and height dimensions, the width and length dimensions being at least twice the height dimension, wherein the side door further includes a second edge having a length and the chassis includes a base having a groove extending at least a portion of the length of the second edge, and wherein the second edge movably fits within the groove of the base to form a hinge allowing the side door to move between the open and closed positions.

7. The host unit of claim 6, wherein the first edge separates from the top surface when the side door is in the open position.

8. The host unit of claim 6, wherein the first edge attaches to the exterior top surface when the side door is in the closed position, and wherein the first edge separates from rear the exterior top surface when the side door is in the open position.

9. The host unit of claim 6, wherein the chassis cover is formed in part from injection molded plastic such that the side door is formed separately from the exterior top surface.

10. A method of accessing components in a computer system, the computer system including a host unit and a display monitor, the host unit including a chassis disposed within a chassis cover, the chassis including mountings for receiving a motherboard which are movable in a direction, the chassis cover having a horizontal orientation with width, length and height dimensions, the width and length dimensions being at least twice the height dimension, the method comprising:

opening a side door of the chassis cover to provide an opening, the side door having a closed position and an open position, the side door having a first edge common with an exterior top surface of the chassis cover when the side door is in the closed position and a second edge having a length, the chassis having a base with a groove extending at least a portion of the length of the second edge, the opening step including detaching the first edge from the exterior top surface and moving the detached side door to open the chassis cover while the second edge of the side door remains movably disposed within the groove of the base;

extending the mountings for receiving the motherboard toward the opening when the side door is in the open position to provide access to components mounted to the chassis, wherein the opening and extending steps are capable of being performed while the display monitor rests on the exterior top surface of the chassis cover while in the horizontal orientation.

11. A method of manufacturing a computer host including a chassis cover to be fitted to a chassis in the computer host, the computer host having a horizontal orientation with width, length and height dimensions, the width and length dimensions being at least twice the height dimension, the chassis including a base with mountings for a motherboard which are movable in a direction, the method comprising:

forming a main piece having at least an exterior top surface;

forming a side door having a first edge fitted to couple to the exterior top surface; and attaching the side door to the main piece by coupling the first edge to the exterior top surface and coupling a second edge of the side door to the chassis so that the side door is in a closed position while permitting the detachment of at least one of the first and second edges from the main piece to place the side door in an open position, wherein the side door is capable of opening to allow access to an interior of the chassis cover when the side door is in the open position, and wherein the chassis cover includes a front bezel and the second edge is attached at a hinge and wherein the first edge is attached to the exterior top surface when the side door is in the closed position and detached from the exterior top surface when the side door is in the open position.

* * * * *